United States Patent
Nakamura et al.

(10) Patent No.: US 7,944,838 B2
(45) Date of Patent: May 17, 2011

(54) APPARATUS, METHOD AND COMPUTER PROGRAM FOR TRAFFIC CONTROL

(75) Inventors: Hajime Nakamura, Saitama (JP); Masaki Fukushima, Saitama (JP); Yoji Kishi, Saitama (JP); Hideyuki Koto, Saitama (JP)

(73) Assignee: KDDI Corporation, Tokyo (JP)

(*) Notice: Subject to any disclaimer, the term of this patent is extended or adjusted under 35 U.S.C. 154(b) by 568 days.

(21) Appl. No.: 11/608,015

(22) Filed: Dec. 7, 2006

(65) Prior Publication Data

US 2007/0165529 A1    Jul. 19, 2007

(30) Foreign Application Priority Data

Jan. 16, 2006 (JP) ................. 2006-007280
Feb. 17, 2006 (JP) ................. 2006-040659
Jun. 21, 2006 (JP) ................. 2006-171084

(51) Int. Cl.
*H04J 1/16* (2006.01)
(52) U.S. Cl. ............... 370/235.1; 370/428; 370/429
(58) Field of Classification Search ....... 370/229–235.1, 370/351, 389, 412, 415, 428, 429
See application file for complete search history.

(56) References Cited

U.S. PATENT DOCUMENTS

| | | | | |
|---|---|---|---|---|
| 5,541,852 A | * | 7/1996 | Eyuboglu et al. | 709/232 |
| 2002/0114334 A1 | * | 8/2002 | Yang | 370/395.1 |
| 2004/0008625 A1 | * | 1/2004 | Lee et al. | 370/229 |
| 2004/0208183 A1 | * | 10/2004 | Balachandran et al. | 370/395.21 |
| 2005/0157723 A1 | * | 7/2005 | Kim et al. | 370/392 |
| 2005/0164709 A1 | * | 7/2005 | Balasubramanian et al. | 455/453 |
| 2007/0115817 A1 | * | 5/2007 | Gupta et al. | 370/230 |
| 2007/0268825 A1 | * | 11/2007 | Corwin et al. | 370/230 |

FOREIGN PATENT DOCUMENTS

| | | |
|---|---|---|
| JP | 07-235945 | 9/1995 |
| JP | 2005-268846 | 9/2005 |

OTHER PUBLICATIONS

Abhay K. Parekh, et al., "A Generalized Processor Sharing Approach to Flow Control in Integrated Services Networks: The Single-Node Case", IEEE/ACM Transactions on Networking, vol. 1, No. 3, Jun. 1993, pp. 344-357.

* cited by examiner

Primary Examiner — Kwang B Yao
Assistant Examiner — Obaidul Huq
(74) Attorney, Agent, or Firm — Oblon, Spivak, McClelland, Maier & Neustadt, L.L.P.

(57) ABSTRACT

Traffic control for a communication network using a token bucket. Tokens stored in the token bucket and data throughput to/from a data buffer are monitored, and a new token rate is determined based on the data throughput during the period that at least one token is stored in the token buffer.

15 Claims, 7 Drawing Sheets

APPARATUS, METHOD AND COMPUTER PROGRAM FOR TRAFFIC CONTROL

PRIORITY CLAIM

This application claims priority from Japanese patent application No. 2006-007280 filed on Jan. 16, 2006, No. 2006-040659 filed on Feb. 17, 2006, and No. 2006-171084 filed on Jun. 21, 2006, which are incorporated herein by reference.

BACKGROUND OF THE INVENTION

1. Field of the Invention

The present invention relates to traffic flow control using a token bucket for communication systems.

2. Description of the Related Art

Figure 7:
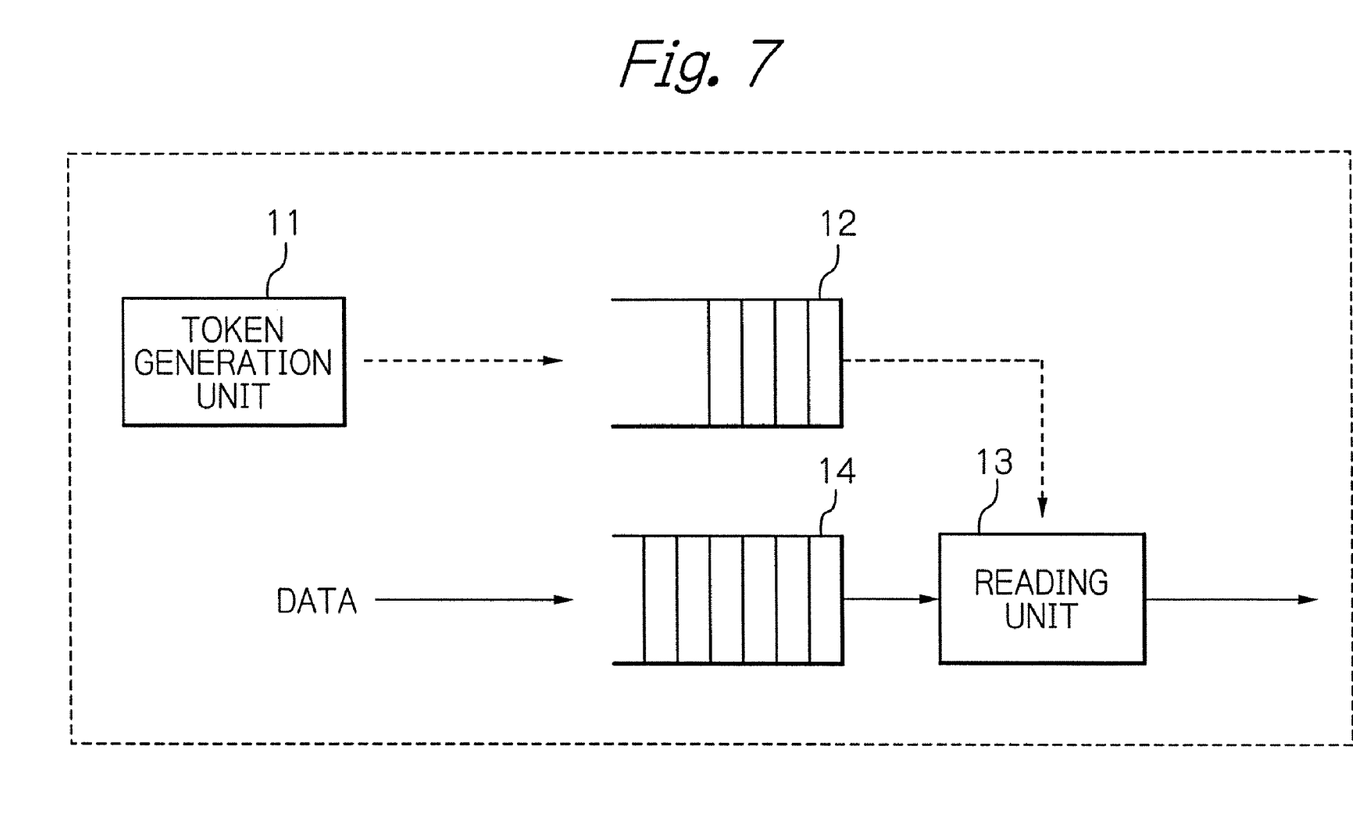
FIG. 7, already described, shows an arrangement for traffic control according to the prior art.

"A Generalized Processor Sharing Approach to Flow Control in Integrated Services Networks: The Single-Node Case" by A. Parekh and R. Gallager (IEEE/ACM transactions on Networking Vol. 1, No. 3, June 1993) discloses a token bucket method for traffic control for communication apparatus. FIG. 7 shows an arrangement for traffic control using a token bucket according to the prior art. The arrangement shown in FIG. 7 is applied to transmitting side and receiving side of the communication apparatus.

Here, applying to transmitting side of the communication apparatus intends to control traffic to a network directly, and applying to receiving side of the communication apparatus intends to control traffic from a remote apparatus indirectly. That is, by limiting the data received by the apparatus, traffic flow control of the upper layer works and limits the data that the remote apparatus transmits to the network.

According FIG. 7, the apparatus for traffic control using a token bucket includes a token generation unit 11, a token buffer 12, a reading unit 13 and a data buffer 14.

The token generation unit 11 generates predetermined number, referred to as "token generation number", of tokens at predetermined frequency, referred to as "token generation frequency", and outputs them to the token buffer 12. The token buffer 12, which is so called token bucket, holds tokens generated by the token generation unit 11. On the other hand, the data buffer 14 is a buffer for storing data. In case of transmitting side, the data is data or a packet transmitting to the network, and in case of receiving side, the data is data or a packet from the network, and for example, output to other function blocks in the apparatus or common bus.

Token is a right for reading out the data from the data buffer 14, and the reading unit 13 reads out the predetermined amount of data, for example 1 bit or 1 byte, from the data buffer 14 by consuming one token. A product of token generation frequency (generations/second), token generation number (tokens/generation) and volume of read out data by consuming one token (bits/token) is referred to as token rate (bits/second). The token rate is equal to the averaged data rate read out by the reading unit 13, on the condition that amount of data to/from the network is large enough.

Traffic control using a token bucket can read out the data at data rate above the token rate while the token buffer contains sufficient tokens, which are accumulated while the intensity of data to/from the network is smaller than the token rate.

SUMMARY OF THE INVENTION

For traffic control using a token bucket, it is a question how to decide the token rate. If the token rate is too high, it is the same situation without traffic control, and if the token rate is too low, it can read out only small amount of data, even though the available bandwidth is high.

The invention has been made in view of the above-mentioned problem, and it is therefore an object of the present invention to provide a traffic control apparatus and method using variable token rate according to the status of network, as well as the computer program product for the apparatus and the method.

According to the present invention, a traffic control apparatus includes a data buffer for storing data to/from a network, a token rate determination unit for determining a toke rate, a token generation unit for generating tokens in accordance with the token rate, a token buffer or bucket for storing generated tokens, a reading unit for reading out predetermined amount of data from the data buffer by consuming a token stored in the token buffer, a token buffer monitoring unit for monitoring tokens stored in the token buffer, and a data throughput monitoring unit for monitoring data throughput to/from the network. The token rate determination unit determines new token rate based on the data throughput during the period that at least one token is stored in the token buffer.

According to the present invention, a traffic control method includes the steps of, generating tokens in accordance with a token rate, storing generated tokens in a token buffer and data to/from a network in a data buffer, monitoring tokens stored in the token buffer and data throughput to/from the network, and determining a new token rate based on the data throughput during the period, i.e. token-stored period, that at least one token is stored in the token buffer.

Favorably, the token rate is updated to the new token rate after entering a token empty state that no token is stored in the token buffer.

If one or more tokens are stored in the token buffer, data throughput is not limited by the token bucket method. It means that the data throughput during the token-stored period shows the bandwidth given by the network. By determining the new token rate using the data throughput during the period, it is possible to adapt the traffic control autonomously to the network status.

Advantageously, if the token empty state continues for a predetermined period, a number of tokens to be appended to the token buffer are determined, and then determined number of tokens is appended to the token buffer.

If no token is stored in the token buffer, data throughput is limited at the token rate by the token bucket method. In this case the data throughput does not represent the bandwidth of the network. Therefore, if the token empty state continues for predetermined period, some tokens are appended to the token buffer for acquiring the data throughput, which represents the network status, and calculating the new token rate.

Favorably, the token rate is decreased, in case the increment of tokens in the token buffer continues for a predetermined period.

Advantageously, congestion information, which indicates a degree of congestion of the network, is obtained from the network, and is used for determining the new token rate. Preferably, the congestion information is a number of holding channels indicating a number of mobile terminals sharing the same radio link, or a ratio of assigned radio resources to assignable radio resources.

By using the congestion information for determining the new token rate, it is possible to perform traffic control, which takes into consideration the degree of network congestion.

According to the present invention, a program for controlling traffic to/from a network includes program codes or instructions, which configures a computer system as the above mentioned apparatus, or which makes computer system execute above mentioned method.

Further objects and advantages of the present invention will be apparent from the following description of the preferred embodiments of the invention as illustrated in the accompanying drawings.

DETAILED DESCRIPTION OF THE INVENTION

Figure 1:
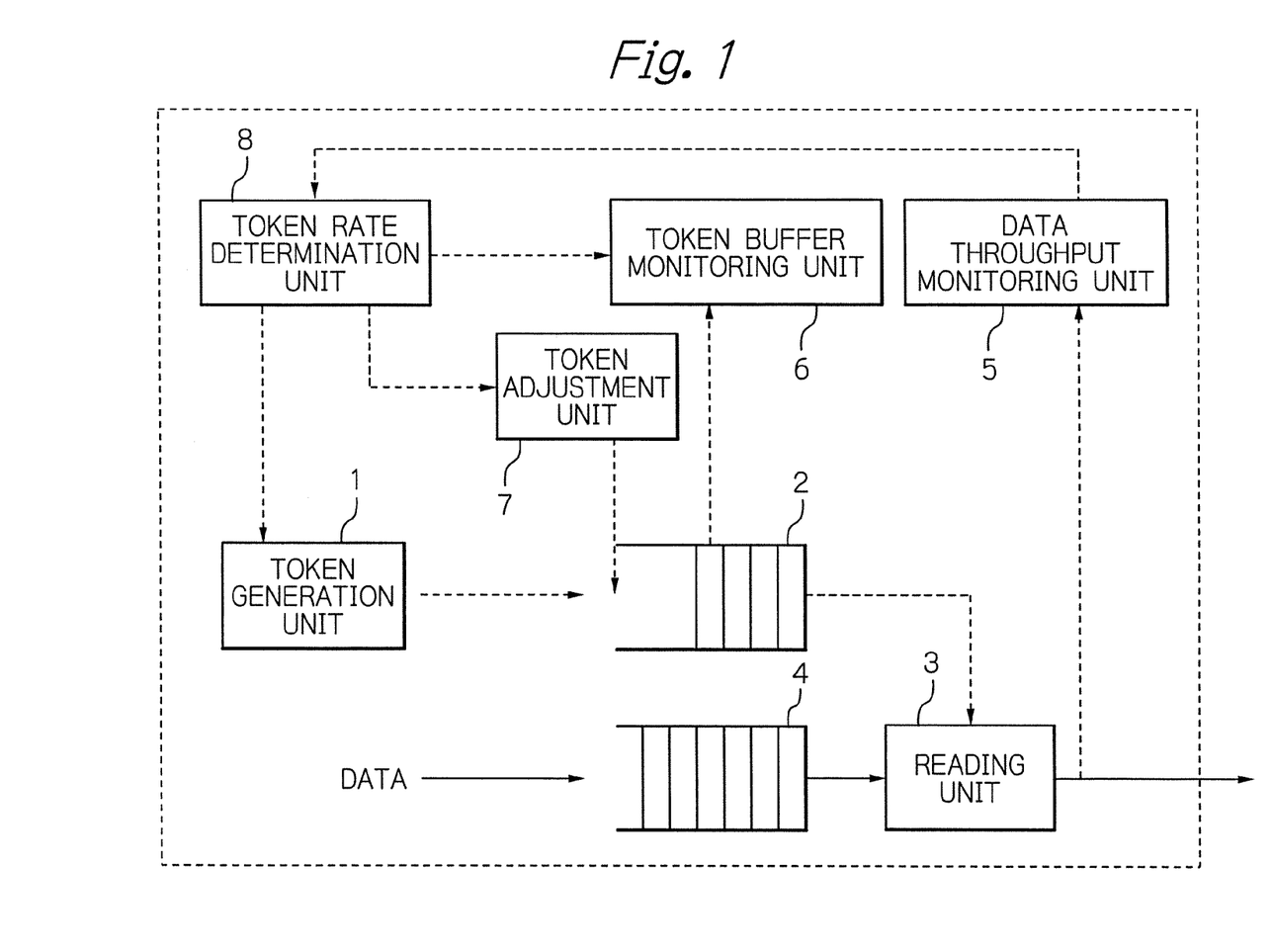
FIG. 1 shows a block diagram of an apparatus for traffic control at transmitting side according to the invention.
Figure 2:
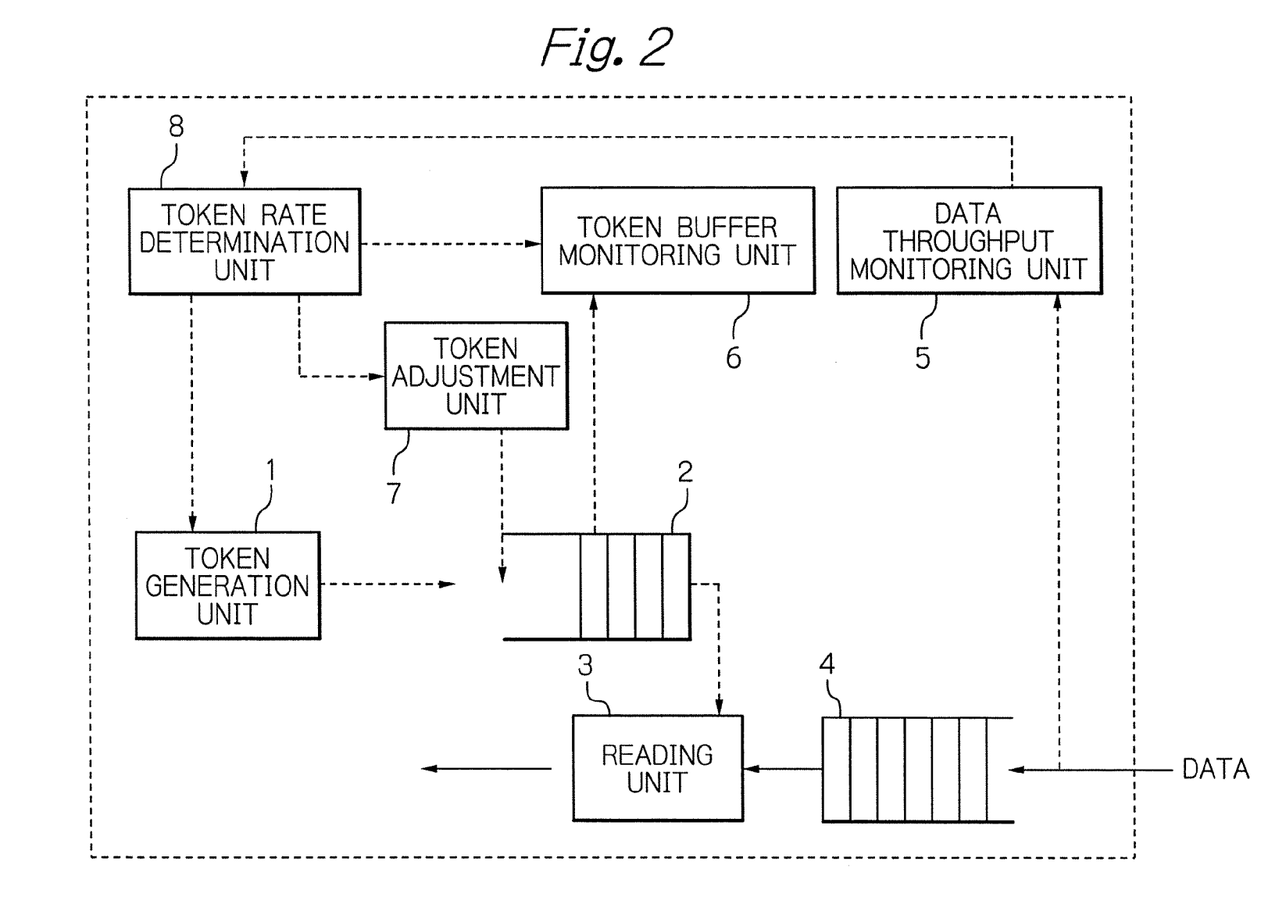
FIG. 2 shows a block diagram of an apparatus for traffic control at receiving side according to the invention.

FIG. 1 and FIG. 2 respectively show block diagrams of an apparatus for controlling traffic according to the invention. FIG. 1 shows the arrangement for transmitting side, while FIG. 2 shows the arrangement for receiving side. According to FIG. 1 and FIG. 2, the traffic control apparatus includes a token generation unit 1, a token buffer 2, a reading unit 3, a data buffer 4, a data throughput monitoring unit 5, a token buffer monitoring unit 6, a token adjustment unit 7 and a token rate determination unit 8.

The token generation unit 1 generates tokens, which is equal to a token generation number, at predetermined frequency called a token generation frequency, and outputs tokens to the token buffer 2. The token generation number and/or token generation frequency are decided by the token rate determination unit 8 as described later. The token buffer 2, which is so called token bucket, stores tokens generated by the token generation unit 1. On the other hand, the data buffer 4 is a buffer for data or a packet to/from the network.

The reading unit 3 reads out the predetermined amount of data, for example 1 bit or 1 byte, from the data buffer 4 by consuming one token in the token buffer 2.

The data throughput monitoring unit 5 measures the data throughput to/from the network by monitoring the output of the reading unit 3 or input of the data buffer 4, and outputs the measured throughput to the token rate determination unit 8. The token buffer monitoring unit 6 monitors tokens stored in the token buffer 2, and outputs the stored token information, which indicates the status of stored tokens, to the token rate determination unit 8.

The token rate determination unit 8 determines a new token rate based on the data throughput measured by the data throughput monitoring unit 5 and the stored token information from the token buffer monitoring unit 6, and calculates a new token generation number and/or a new token generation frequency based on the new token rate. Then, the token rate determination unit 8 outputs the new token generation number and/or the new token generation frequency to the token generation unit 1. Here, a product of the new token generation number (tokens/generation) and the new token generation frequency (generations/second) is calculated by dividing the new token rate (bits/second) by the amount of data, which is read out by the reading unit 3 from the data buffer 4 by consuming one token. The token rate determination unit 8 can varies the token generation frequency only while using the fixed value for the token generation number. By contrary, the token rate determination unit 8 can varies the token generation number only while using the fixed value for the token generation frequency. Of course, both values can be varied. In case only one value is varied, the token rate determination unit 8 may outputs only varied value to the token generation unit 1.

Figure 4:
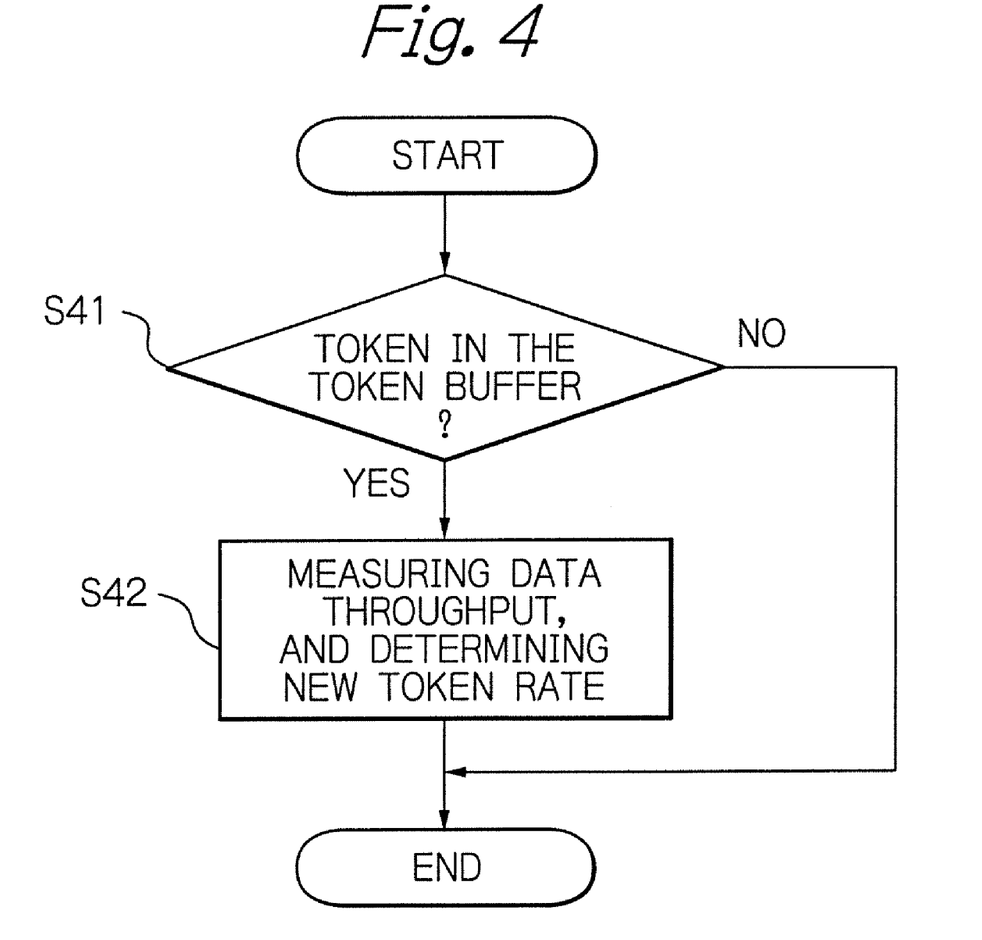
FIG. 4 shows a flow chart according to the invention.

FIG. 4 shows a flow chart according to the invention. If one or more tokens are stored in the token buffer 2, data throughput is not limited by the token bucket method, and it represents the bandwidth given by the network. By contrary, if no token is stored in the token buffer 2, data throughput is limited by the token bucket, and it does not show the network bandwidth. Therefore, according to the invention, the token rate determination unit 8 uses the data throughput during the period, which the token buffer 2 stores at least one token, for determination of the new token rate, and does not take into consideration the data throughput while the token buffer 2 is empty.

Figure 5:
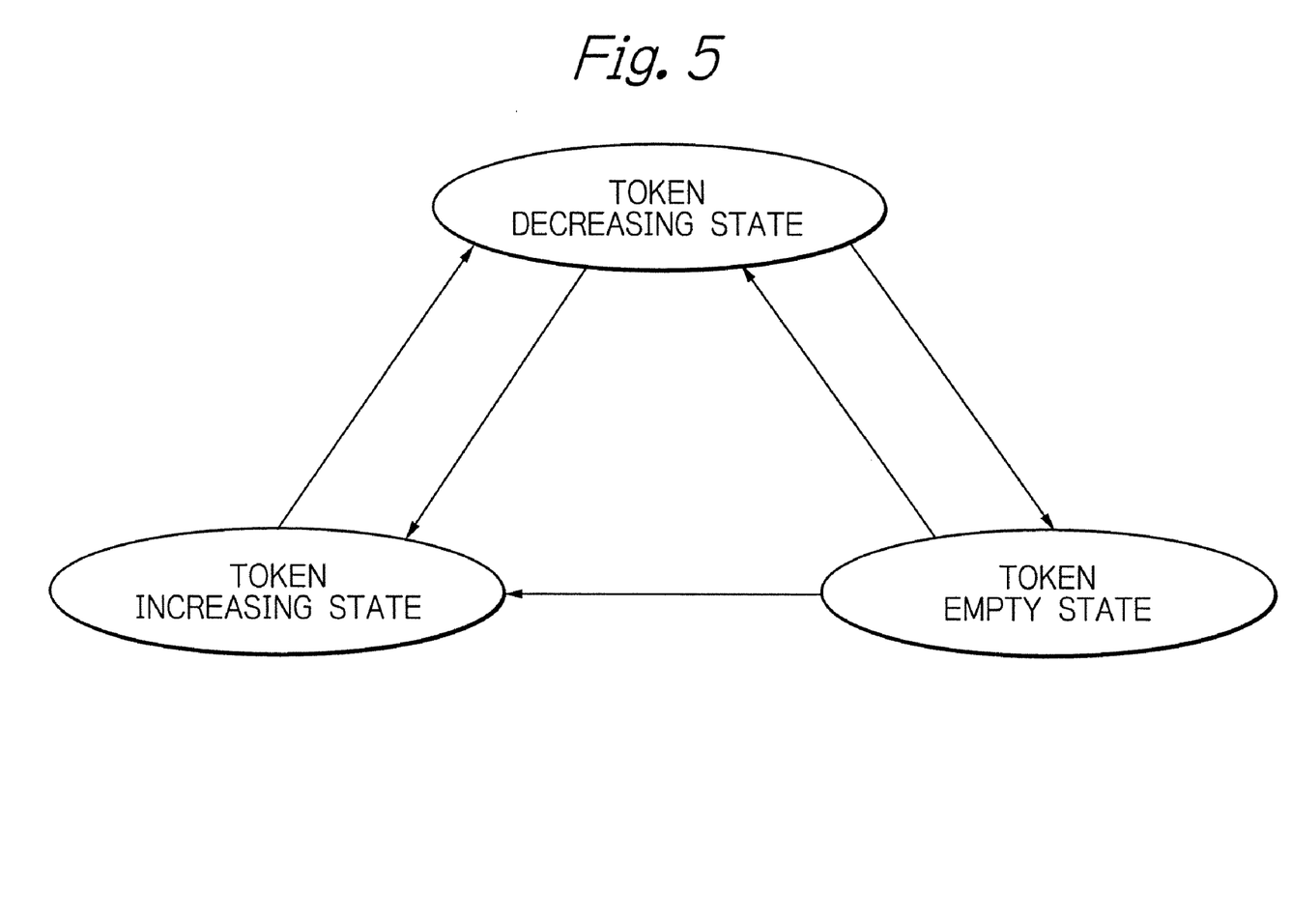
FIG. 5 shows a state machine managed by the token rate determination unit.

FIG. 5 shows a state machine, which the token rate determination unit 8 manages based on the stored token information from the token buffer monitoring unit 6. Token decreasing state is a state that the data throughput is higher than the token rate. That is, the number of tokens consumed by the reading unit 3 is more than the one input to the token buffer 2.

Token increasing state is a state that the data throughput is lower than the token rate. That is, the number of tokens consumed by the reading unit 3 is less than the one input to the token buffer 2. Because entering and staying this state means the traffic control is too loose, the token rate determination unit 8 determines the new token rate, which is lower than the current value, based on the data throughput during the token increasing state, and update to the new token rate, if the token increasing state continues for predetermined period.

Token empty state is a state that input tokens to the token buffer 2 are immediately consumed by the reading unit 3 for data output from the data buffer 4, and in this state, data throughput is equal to the token rate. Because entering this state means the data throughput monitoring unit 5 can no more measure the network bandwidth, the token rate determination unit 8 updated the token rate to new value, which is determined based on the data throughput while in the token decreasing and/or increasing states. Furthermore, in case the token empty state continues for predetermined period, the token rate determination unit 8 instructs the token adjustment unit 7 to append some tokens to the token buffer 2 for forcible transition to the token decreasing state.

The token rate determination unit 8 determines the new token rate based on the data throughput during the token decreasing and/or increasing states, and update to the new token rate after entering the token empty state. It is preferable to update when it enters the token empty state from the token decreasing state.

And in the trigger of state transition is explained. The transition from the token increasing state to the token decreasing state occurs when the data throughput increases above the token rate, or the token rate determination unit 8 updates the token rate below the data throughput. The transition from the token decreasing state to the token increasing state occurs when the data throughput decreases below the token rate.

The transition from the token empty state to the token increasing state occurs when the data throughput decreases below the token rate, or the token rate determination unit 8 updates the token rate above the data throughput at entering the token empty state.

The transition from the token empty state to the token decreasing state occurs, in case the token rate determination unit 8 makes the token adjustment unit 7 append tokens to the token buffer 2. The transition from the token decreasing state to the token empty state occurs, in case the reading unit 3 consumes all tokens in the token buffer 2.

Figure 6:
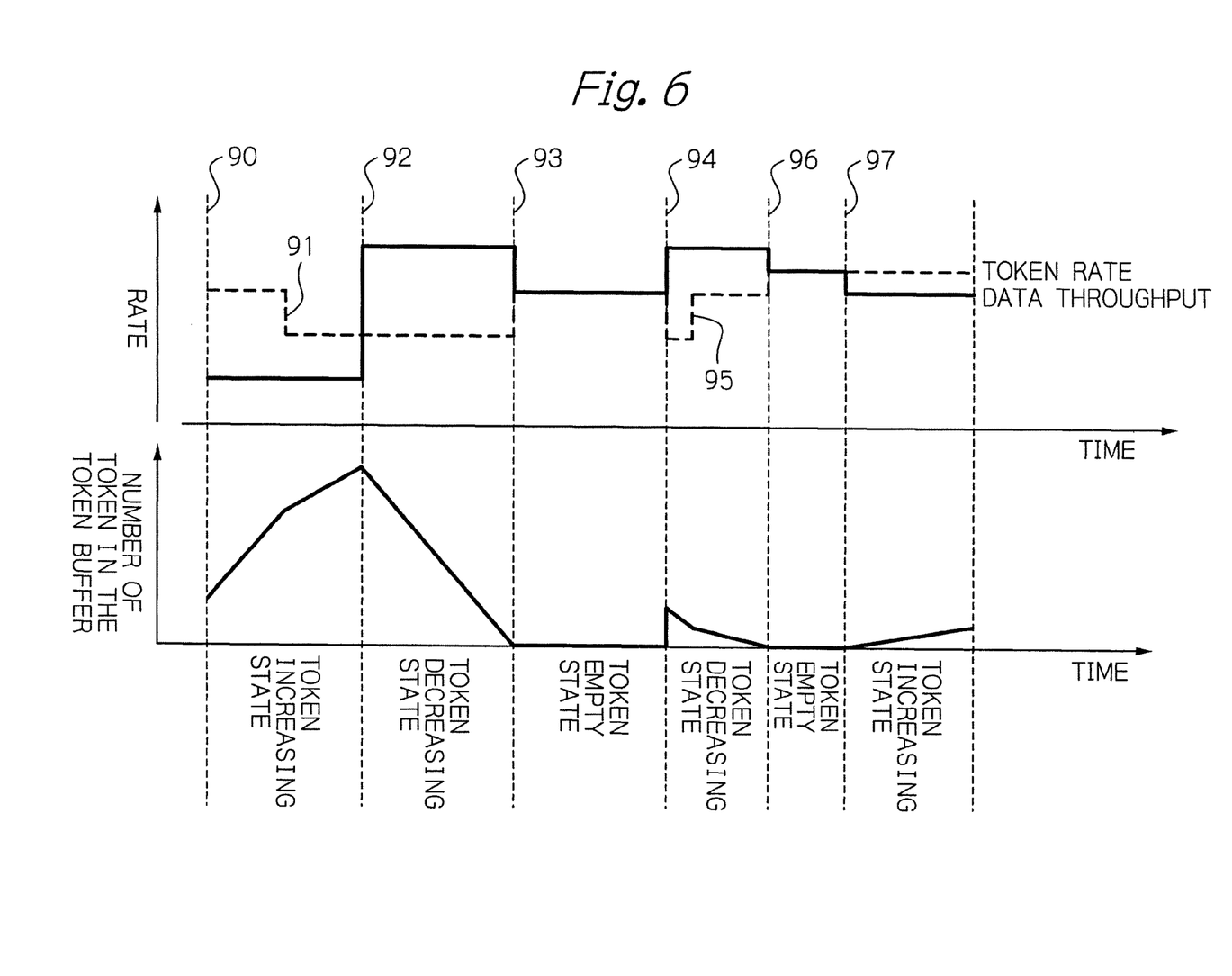
FIG. 6 shows the relation of each state, token rate and data throughput.

FIG. 6 shows an example of the relation of each state described above, token rate and data throughput. The token rate is higher than the data throughput in the period denoted between reference numeral 90 and 92, therefore, number of tokens stored in the token buffer 2 increases. Because it stays in the token increasing state for predetermined period, the token rate is decreased at the time denoted by reference numeral 91 by the token rate determination unit 8. However, the token rate is still higher than the data throughput, it is still in the token increasing state.

At the time denoted by reference numeral 92, it enters the token decreasing state, because the data input to the data buffer 4 increases, and data throughput becomes higher than the token rate. And then it enters the token empty state at the time denoted by reference numeral 93, because no token is stored in the token buffer 2 at this point. At this time, the token rate determination unit 8 updates the token rate to the new value determined based on the data throughput during token-stored period, for example period denoted between reference numeral 92 and 93. According to FIG. 6, the token rate is increased. However, the amount of input data to the data buffer 4 is big with respect to the updated token rate, it stays in the token empty state.

Because it stays in the token empty state for predetermined period, the token rate determination unit 8 instructs the token adjustment unit 7, and the token adjustment unit 7 appends the number of tokens indicated by the token rate determination unit 8 to the token buffer 2 at the time denoted by reference numeral 94. Since some tokens are added to the token buffer 2, it enters the token decreasing state. Also the token rate determination unit 8 temporarily decreases the token rate to compensate the token rate, which is increased due to the addition of tokens by the token adjustment unit 7, as described its detail later. According to FIG. 6, the token rate determination unit 8 decreases the token rate during the period denoted between reference numeral 94 and 95.

At the time denoted by reference numeral 96, it enters the token empty state again, and the token rate determination unit 8 updates the token rate to the value determined by the data throughput in the period, for example, denoted between reference numeral 94 and 96. According to FIG. 6, the token rate is increased. However, the amount of input data to the data buffer 4 is still big with respect to the updated token rate, it stays in the token empty state.

At the time denoted by reference numeral 97, input data to the data buffer 4 decreases, and it enters the token increasing state.

Then, the calculation of the new token rate, which is based on the data throughput while in the token decreasing and/or increasing states, is explained. The easy way of calculating the new token rate is multiplying the last value or maximum value of the data throughput during the token decreasing and/or increasing states by the predetermined allowable factor. Also it is possible to use an averaged value of the data throughput during the token decreasing and/or increasing states, instead of the last or maximum value. Averaging period may be whole or some periods in the token decreasing and/or increasing states.

Further, it is possible to use a last or maximum value of exponential moving averaged data throughput during the token decreasing and/or increasing states.

For example, the nth sample $X_n$ of the data throughput is obtained at time $t_n$, then the exponential moving averaged value $A_n$ is, $$A_n = (1-C)*A_{n-1} + C*X_n$$

Where $C = 1 - \text{Exp}(-1/T)^{\Delta t}$, $\Delta t = t_n - t_{n-1}$, and T is any constant value.

Moreover, the token rate can be limited to the predetermined maximum/minimum token rate, in case the calculated new token rate above/below the maximum/minimum token rate.

New decreased token rate can be determined by the same method described above, in case it stays the token increasing sated for the predetermined period. That is, the maximum or last data throughput during the period between entering token increasing state and the predetermined time point after entering the token increasing state is multiplied by another allowable factor for calculating the new token rate. Of course it is possible to use the exponential moving averaged data throughput described above.

The method for determining the new token rate is not limited described above. For example, it can use the table, which shows the relation of the data throughput to the token rate. In this case, different table can be used for the toke rate increment and decrement, respectively.

Then, the addition of tokens to the token buffer 2 that is performed when it stays the token empty state for predetermined period is explained. The token empty state is the state in which the traffic to/from the network is limited to the token rate, and the data throughput during the token empty state does not represent the network bandwidth. Therefore, the token adjustment unit 7 appends some tokens to the token buffer 2 for forcible transition to the token decreasing state, and then the token rate determination unit 8 determines the new token rate to adapt to the varying network bandwidth. For this purpose, the token rate determination unit 8 informs the number of tokens to be appended to the token adjustment unit 7. The number of tokens to be appended can be a fixed value or a variable value. In case variable value is applied, it can use the value that corresponds to the amount of data read out during the predetermined period using the current token rate.

By appending some tokens to the token buffer 2, the average token rate is equivalently increased. To compensate this increment of the token rate, the rate determination unit 8 decreases the token rate for a period after appending tokens to the token buffer 2. The period can be a fixed period, and in this case, the token rate determination unit 8 decides the decreased token rate based on the period. On the contrary, the token rate determination unit 8 can decide decreased token rate by the predetermined decreasing ratio, and in this case the period can be decided based on the decreased token rate.

While in the token increasing state and token decreasing state, the data throughput at output side of the reading unit 3 is the same as the one at input side of the data buffer 4, therefore, monitoring point of the data throughput monitoring unit 5 can be either output side of the reading unit 3 or input side of the data buffer 4.

Figure 3:
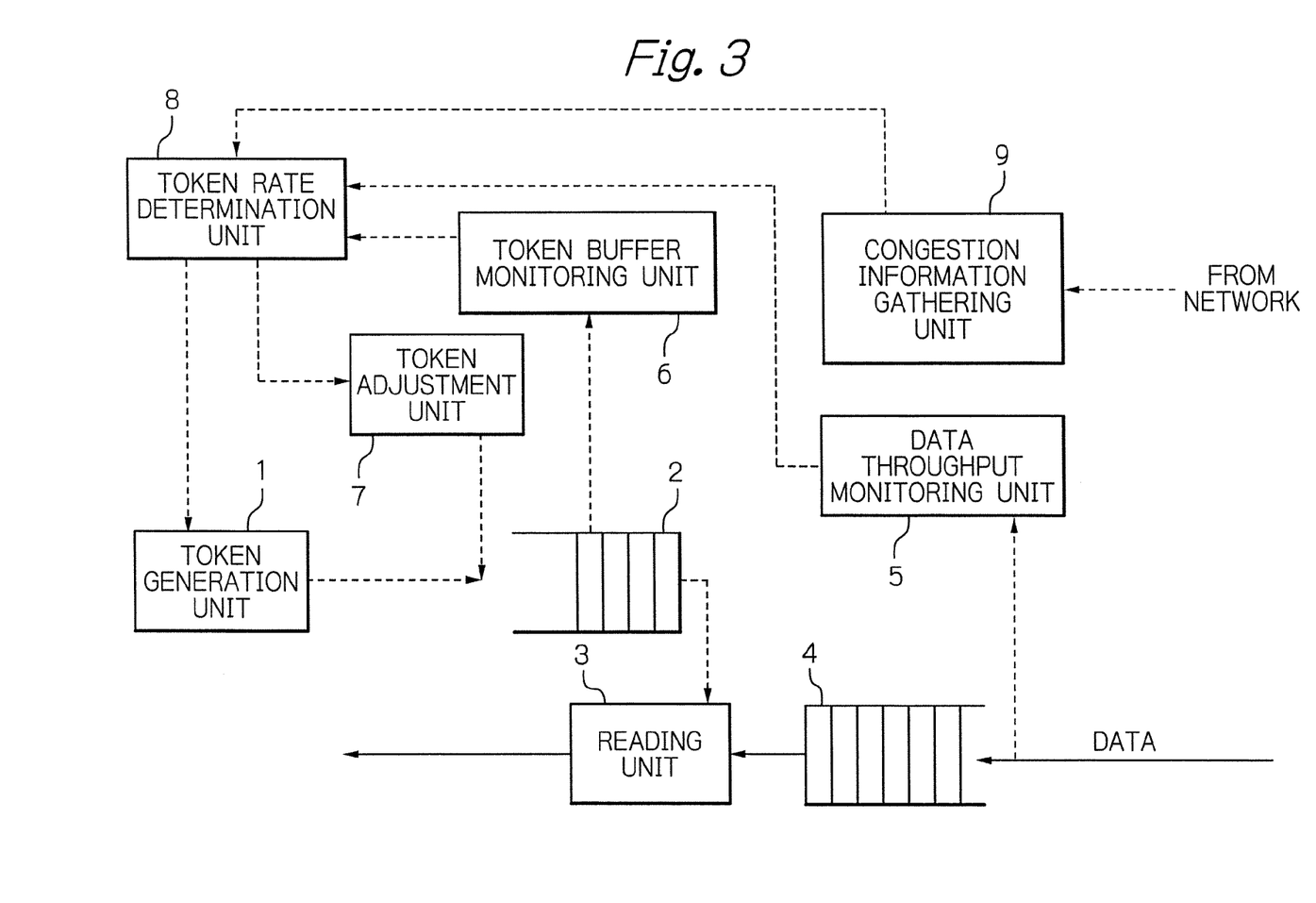
FIG. 3 shows a block diagram of an apparatus for traffic control according to another embodiment of the invention.

FIG. 3 shows a block diagram of a traffic control apparatus for controlling traffic according to another embodiment of the invention. The same numeral reference is used for the similar element, and detailed explanation is omitted for the element. In case the data is input to the data buffer 4 from the network, it shows the configuration for receiving side, and in case the data is input to the data buffer 4 from inside the apparatus, it shows the configuration for transmitting side. According to FIG. 3, the apparatus further has a congestion information gathering unit 9 in addition to the configuration shown in FIGS. 1 and 2.

The congestion information gathering unit 9 receives congestion information from the network, and informs the congestion information to the token rate determination unit 8. The congestion information indicates a degree of congestion of the network or an access link to the network. An example of congestion information includes, but is not limited to, number of holding channels, which is the number of mobile terminals that share the same radio link to the same base station. The number of holding channels is normally informed to each mobile terminal by the base station of the mobile telecommunication system. Another example of congestion information is the ratio of assigned radio resource, which is for example time slots or frequency bandwidth, to assignable radio resource.

Further it can use the power of interfering signal from other mobile terminals sharing the same radio link, in case the system is in accordance with the Code Division Multiple Access. In this case, the base station quantizes the sum of signal power from the other mobile terminals, and informs quantized value to the interfered mobile terminal.

According to the embodiment, the allowable factor is not fixed value, and is varied in accordance with the congestion information. More precisely, the heavier the congestion is, the smaller the allowable factor is. Following Table 1 shows the example of allowable factor against the number of holding channels as the congestion information.

TABLE 1

| Number Of Holding Channels | Allowable Factor |
|---|---|
| 1-10 | 0.9 |
| 11-30 | 0.7 |
| 31-45 | 0.5 |
| 46- | |

As shown in Table 1, the token rate is limited to smaller allowable factor, as the number of holding channels increases. Because the number of holding channels indicates the number of mobile terminals communicating with the same base station, traffic is controlled based on the number of mobile terminals communicating with the same base station.

In case the number of holding channels is more than or equal to the predetermined threshold, which is for example 46 in Table 1, the reading unit 3 stops reading out from the data buffer 4. This prevents heavy congestion of the network, in case the great number of mobile terminals communicates with the same base station.

For the embodiment, a link speed can be used instead of the data throughput, because the allowable factor is varied depends on the congestion of the network.

According to the embodiment, the token rate can be determined by considering the congestion information. Therefore, it is possible to control the traffic by the number of communication terminals sharing the same resources. The embodiment is explained using the base station of the wireless system, which informs the congestion information to mobile terminals. However, the invention can be applied to the wire line system, in case the system has the apparatus that informs the congestion information to communication terminals.

Many modifications and variations will be apparent those of ordinary skilled in the art. The embodiments was chosen and described in order to best explain the principles of the invention. It should be understood that the present invention is not limited to the specific embodiments described in the specification, except as defined in the appended claims.

For example, the invention may be achieved by a program product, which realizes the functions of the above embodiments. Programs defining functions on the invention can be delivered to a computer system using computer readable storage media or via network. It should be understood the invention may be implemented by software, hardware or a combination of software and hardware.

The invention claimed is
1. A traffic control apparatus, comprising:
   a data buffer configured to store data sent to/from a network;
   a token rate determination unit configured to determine a token rate;
   a token generation unit configured to generate tokens in accordance with the token rate;
   a token buffer configured to store generated tokens;
   a reading unit configured to read out predetermined amount of data from the data buffer by consuming a token stored in the token buffer;
   a token buffer monitoring unit configured to monitor tokens stored in the token buffer;
   a data throughput monitoring unit configured to monitor data throughput to/from the network during a period when one or more tokens are stored in the token buffer; and
   a token adjustment unit configured to append tokens to the token buffer when a token empty state, in which no tokens are stored in the token buffer, continues for a first period,
   wherein the token rate determination unit
      determines a new token rate based on the data throughput monitored at the data throughput monitoring unit, and
      temporarily decreases the token rate, in response to the token rate being increased due to an addition of tokens by the token adjustment unit, to compensate the token rate.

2. The traffic control apparatus according to claim 1, wherein the token rate determination unit decreases the token rate, in case the increment of tokens stored in the token buffer continues for a second period.

3. The traffic control apparatus according to claim 2, further comprising:
   a unit configured to gather congestion information from the network, the congestion information indicating a degree of congestion of the network,
   wherein the token rate determination unit uses the congestion information for determining the new token rate.

4. The traffic control apparatus according to claim 2, wherein the congestion information is a number of holding channels indicating a number of mobile terminals sharing the same radio link.

5. The traffic control apparatus according to claim 2, wherein the congestion information is a ratio of assigned radio resources to assignable radio resources.

6. A traffic control method of a traffic control apparatus, comprising:
   generating, with a token generation unit of the traffic control apparatus, tokens in accordance with a token rate;
   storing generated tokens in a token buffer of the traffic control apparatus and data to/from a network in a data buffer of the traffic control apparatus;
   monitoring, with a token buffer monitoring unit of the traffic control apparatus, tokens stored in the token buffer;

monitoring, with a data throughput monitoring unit of the traffic control apparatus, data throughput to/from the network during a period when one or more tokens are stored in the token buffer;

appending, with a token adjustment unit of the traffic control apparatus, tokens to the token buffer when a token empty state, in which no tokens are stored in the token buffer, continues for a first period;

determining, with a token rate determination unit of the traffic control apparatus, a new token rate based on the data throughput monitored at the data throughput monitoring unit; and temporarily decreasing, with the token rate determination unit of the traffic control apparatus, the token rate, in response to the token rate being increased due to an addition of tokens by the token adjustment unit, to compensate the token rate.

7. The traffic control method of a traffic control apparatus according to claim 6, wherein the token rate is decreased, in case the increment of tokens stored in the token buffer continues for a second period.

8. The traffic control method of a traffic control apparatus according to claim 7, further comprising:

gathering congestion information from the network, the congestion information indicating a degree of congestion of the network, wherein the congestion information is used for determining the new token rate.

9. The traffic control method of a traffic control apparatus according to claim 7, wherein the congestion information is a number of holding channels indicating a number of mobile terminals sharing the same radio link.

10. The traffic control method of a traffic control apparatus according to claim 7, wherein the congestion information is a ratio of assigned radio resources to assignable radio resources.

11. A non-transitory computer readable storage medium encoded with a computer readable program configured to cause an information processing apparatus to execute a method for controlling traffic to/from a network, the method comprising:

generating tokens in accordance with a token rate;
storing generated tokens in a token buffer;
storing data to/from the network in a data buffer;
monitoring tokens stored in the token buffer;
monitoring data throughput to/from the network during a period when one or more tokens are stored in the token buffer;
appending tokens to the token buffer when a token empty state, in which no tokens are stored in the token buffer, continues for a first period;
determining a new token rate based on the monitored data throughput to/from the network; and
temporarily decreasing the token rate, in response to an increase in the token rate due to an addition of tokens, to compensate the token rate.

12. The non-transitory computer readable storage medium according to claim 11, wherein the token rate is decreased, in case the increment of tokens stored in the token buffer continues for a second period.

13. The non-transitory computer readable storage medium according to claim 12, further comprising:

gathering congestion information from the network, the congestion information indicating a degree of congestion of the network,
wherein the congestion information is used for determining the new token rate.

14. The non-transitory computer readable storage medium according to claim 12, wherein the congestion information is a number of holding channels indicating a number of mobile terminals sharing the same radio link.

15. The non-transitory computer readable storage medium according to claim 12, wherein the congestion information is a ratio of assigned radio resources to assignable radio resources.

* * * * *